(12) United States Patent
Brinkman et al.

(10) Patent No.: US 6,594,049 B1
(45) Date of Patent: Jul. 15, 2003

(54) OPTICAL ROUTER

(75) Inventors: William Frank Brinkman, Basking Ridge, NJ (US); Martin Zirngibl, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/430,318

(22) Filed: Oct. 29, 1999

(51) Int. Cl.[7] .................. H04B 10/00; H04J 14/00; H04J 14/08
(52) U.S. Cl. .................. 359/127; 359/123; 359/139; 359/135; 359/126; 385/24
(58) Field of Search ................. 359/127, 123, 359/139, 135, 126; 385/24

(56) References Cited

U.S. PATENT DOCUMENTS

| | | | |
|---|---|---|---|
| 5,002,350 A | | 3/1991 | Dragone .............. 350/96.15 |
| 5,136,671 A | | 8/1992 | Dragone .............. 385/46 |
| 5,339,157 A | * | 8/1994 | Glance et al. ........... 385/24 |
| 5,367,586 A | * | 11/1994 | Glance et al. ........... 359/114 |
| 5,373,517 A | * | 12/1994 | Dragone et al. ......... 372/20 |
| 5,390,200 A | * | 2/1995 | Zirngibl .............. 372/20 |
| 5,483,369 A | * | 1/1996 | Darcie et al. .......... 310/313 R |
| 5,506,712 A | * | 4/1996 | Sasayama et al. ....... 359/123 |
| 5,600,742 A | * | 2/1997 | Zirngibl .............. 385/10 |
| 5,867,291 A | * | 2/1999 | Wu et al. ............. 359/124 |
| 5,889,906 A | * | 3/1999 | Chen ................. 359/115 |
| 5,909,522 A | * | 6/1999 | Shirasaki et al. ....... 385/24 |
| 6,049,404 A | * | 4/2000 | Wu et al. ............. 359/117 |
| 6,137,606 A | * | 10/2000 | Wu et al. ............. 359/124 |
| 6,243,402 B1 | * | 6/2001 | Doerr ................ 372/20 |
| 6,330,236 B1 | * | 12/2001 | Ofek et al. ........... 370/369 |
| 6,359,912 B1 | * | 3/2002 | Doerr et al. .......... 372/102 |

FOREIGN PATENT DOCUMENTS

EP 0 639 015 A 2/1995 ........... H04L/12/56

OTHER PUBLICATIONS

Sasayama, K. et al, "Demonstration of a Photonic Frequency–Routing–Type Time–Division Interconnection Network—Frontiernet—and Performance Analysis of FDM Buffers", *Advanced Switching Technologies for Universal Telecommunications at the Beginning of the 21st Century*, Berlin, Apr. 23–28, 1995, Berlin, VDE Verlag, DE., vol. Symp. 15, Apr. 23, 1995.

* cited by examiner

Primary Examiner—Jason Chan
Assistant Examiner—David Payne

(57) ABSTRACT

An optical router and accompanying method utilizing an N×N frequency router and N tunable transmitters. Packets to be routed are "colored" according to their intended destination and applied to an input port of the frequency router such that they appear at a desired output port.

4 Claims, 2 Drawing Sheets

OPTICAL ROUTER

FIELD OF THE INVENTION

The present invention relates generally to the field of telecommunications and in particular to an optical router particularly well suited for use in internetworking, e.g, Internet Protocol (IP) networks.

BACKGROUND OF THE INVENTION

The exponential growth of the Internet has generated tremendous demand for new and highly efficient internetworking components. Components of particular importance to internetworking are routers—devices which route traffic from network to network as appropriate.

Current generation routers are electronic devices whose capacity to route traffic is rapidly being approached. Consequently, enormous interest is being shown in optical routing in the belief that optical routers will provide a capacity and performance suitable to support the growing volume of Internet traffic. We present herein a novel, optical internetwork router.

SUMMARY OF THE INVENTION

We have developed an optical router that utilizes an N×N optical frequency router and N fast transmitters including N fast, tunable lasers and N fast modulators. Routing is performed by determining an intended destination for packets to be routed, appropriately "coloring" the packets in a destination-specific manner, and then transmitting the colored packets through the frequency router wherein it is routed to a desired destination. Unlike prior art routing methods and apparatus, the routing is performed according to color or frequency of the packet, and not by address.

Further features and advantages of the present invention, as well as the structure and operation of various embodiments of the present invention are described in detail below with reference to the accompanying drawing.

BRIEF DESCRIPTION OF THE DRAWING

FIG. 1 illustrates an example of a prior art optical frequency routing device;

FIG. 2 is a schematic diagram of an exemplary N×N router according to the present invention where N=3;

FIG. 3 is a schematic diagram of an exemplary N×N router according to the present invention;

FIG. 4 is a schematic diagram of an exemplary tunable transmitter and modulator according to the present invention; and FIG. 5 is a schematic diagram of our N×N optical internetwork router according to the present invention.

DETAILED DESCRIPTION OF THE INVENTION

By way of background, optical multiplexing, and demultiplexing has been accomplished in the past by using an interconnection apparatus having a number of closely spaced input waveguides communicating with the input of a star coupler. The output of the star coupler communicates with an optical grating having a series of optical waveguides, each of these waveguides differing in length with respect to its nearest neighbor by a predetermined fixed amount. The grating is further connected to the input of a second star coupler, the outputs of which form the outputs of the switching, multiplexing, and demultiplexing apparatus.

An example of such an interconnection apparatus is disclosed in U.S. Pat. Nos. 5,002,350 and 5,136,671. The geometry of such an apparatus may be such that a number of separate and distinct wavelengths each launched into a separate and distinct input port of the apparatus will all combine and appear on a predetermined one of the output ports. In this manner, the apparatus performs a multiplexing function and may advantageously also perform a demultiplexing function. In this demultiplexing situation, a plurality of input wavelengths is directed to a predetermined one of the input ports of the apparatus. Each of the input wavelengths is separated from the others and directed to a predetermined one of the output ports of the apparatus. Advantageously, an appropriate selection of input wavelength permits switching between any selected input port to any selected output port. Accordingly, these devices are referred to as frequency routing devices.

With reference now to FIG. 1, such wavelength routers can be viewed as a generalized Mach-Zehnder arrangement including many "arms", each contributing to the total transmission coefficient between two particular ports. Specifically, the routing device 100 contains a plurality of input ports $\mathbf{2}_i$, i=1,2, . . . ,N connected to the input circle 95 of a free space region 98. A plurality of output ports 30 extends from the output circle 97 of the free space region 98 and is connected to an optical grating 32. The optical grating 32 comprises a plurality of unequal length waveguides 34 connected to the input circle 33 of another free space region 46. The output circle 35 of the free space region 46 is connected to a plurality of output ports $\mathbf{4}_k$, k=1,2, . . . ,N. Typically, the various input and output ports are formed from waveguides.

As can be appreciated, these frequency routing devices may operate as multiplexers and demultiplexers of optical frequencies. For example, if a signal of amplitude A is applied to input port 21, then signals of amplitudes $AT_{11}$, $AT_{12}$, . . . $AT_{1N}$ are produced at the output ports where $T_{ik}$ is the value of the transmission coefficient for input port $\mathbf{2}_i$ and output port $\mathbf{4}_k$. Additional details concerning these frequency routing devices are found in the above-referenced patents which are incorporated herein by reference.

With reference now to FIG. 2, there is shown in schematic form a routing device according to the present invention. Specifically, router 200 comprises router body 201 having three (3) input ports 202(1), 202(2) and 202(3) and three output ports 204(1), 204(2) and 204(3). As should be apparent from the previous discussion of routing devices, optical signals entering router 200 through any of the input ports 202(1) . . . 202(3) are split into their component wavelengths which are then routed to appropriate output port(s) 204(1) . . . 204(3) according to wavelength. With these characteristics in mind, when an optical data signal—perhaps representative of a data packet 210, requires routing, that packet of data may be "colored" appropriately so that it is routed to an appropriate output port 204(1) . . . 204(3) depending upon which input port 202(1) . . . 202(3) receives that packet 210 and what the color of the packet is. As can be appreciated, such data or packets of data may be colored according to their intended destination. A more specific mapping or addressing of input frequencies to output ports of a frequency router is shown schematically in FIG. 3. Of course, those skilled in the art will readily appreciate that the wavelength comb applied to a particular port is not necessarily the same comb applied to another port.

Figure 1:
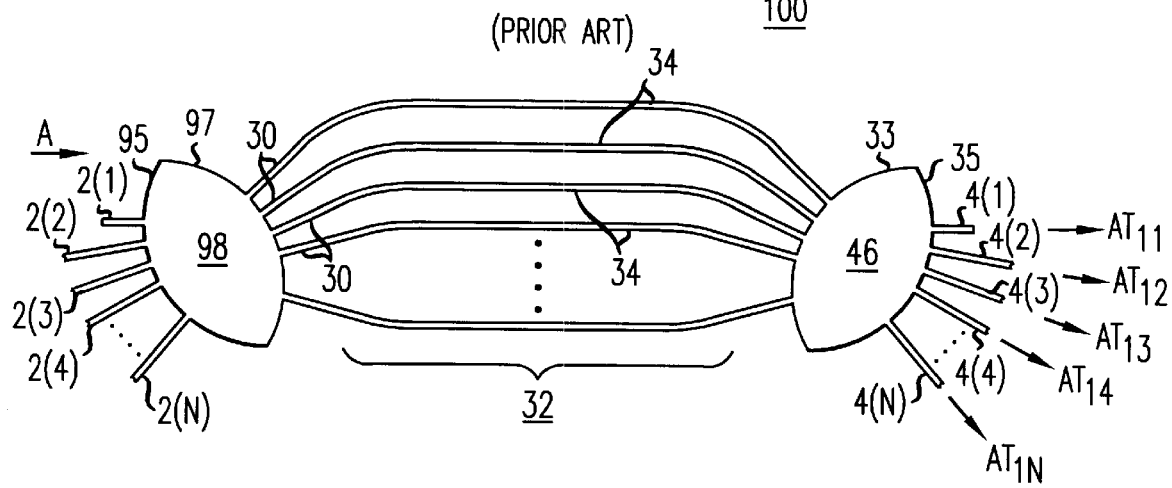
Figure 2:
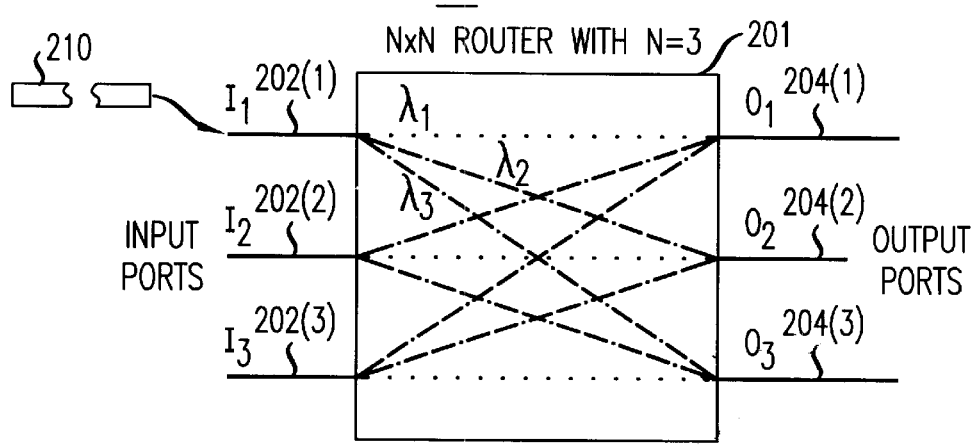
Figure 3:
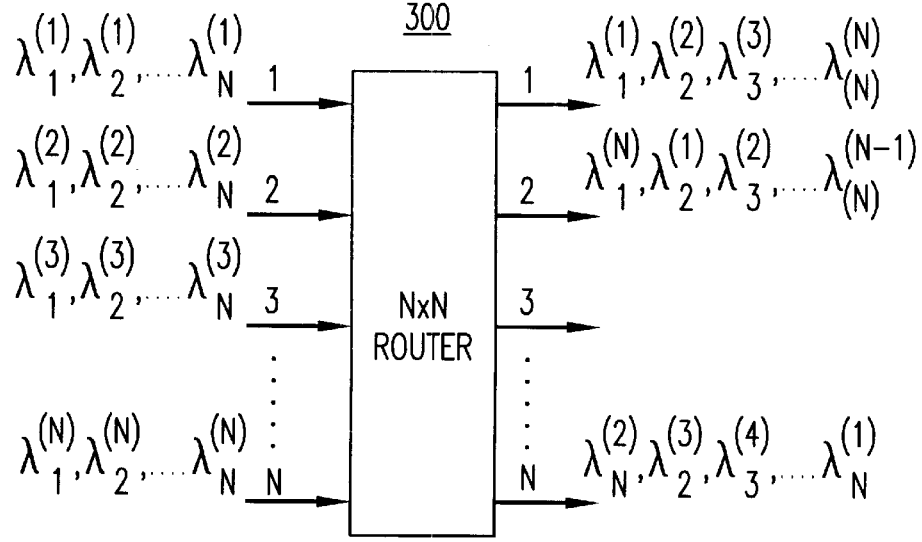
Figure 4:
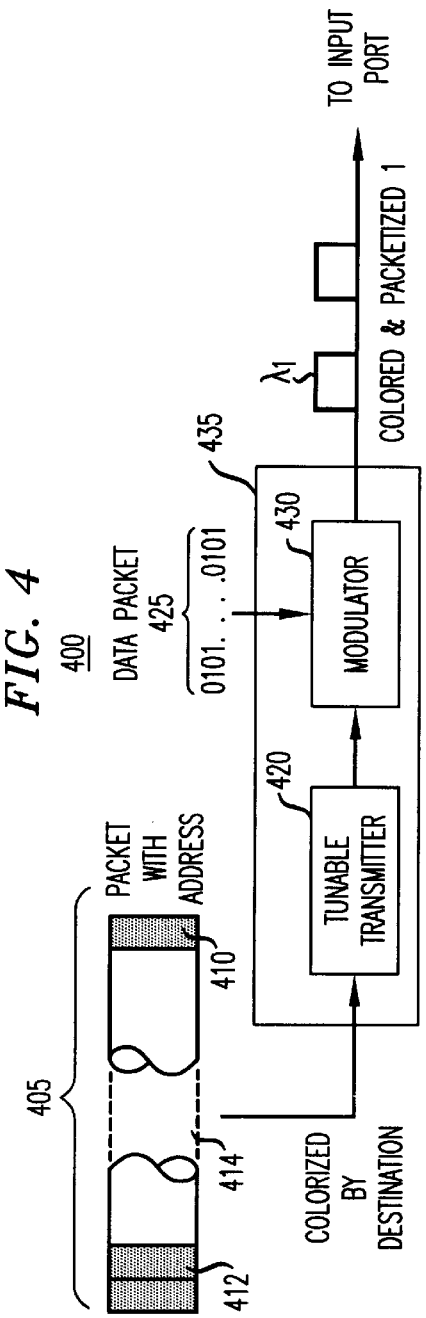

With reference now to FIG. 4, there is shown a schematic drawing of how data or packets of data are colored according to destination prior to presentation to the input ports 202(1) . . . 202(N) of the router 200 shown in FIG. 2. Specifically, packets such as internet protocol (IP) 405 packets include a header portion 412 which typically contains both source and destination identifiers, a data portion 414 and a check portion 410. In particular, the source identifier contained within the header 412 would identify the source or origin of the packet and the destination would identify the intended destination for that packet. The data portion 414 of the packet contains data to be conveyed from the source to the destination and the check portion 410 is typically used by the destination to determine whether the packet 405 and the conveyed data was received correctly at that destination.

According to our invention, the destination of packet 405 (which is contained within header portion 412) is "colored" according to that destination. That is, an appropriate wavelength or color of light is used to transport this packet and hence route it through the frequency router to a specific outport port.

In particular, once a destination determination is made and an appropriate color chosen, a tunable transmitter assembly 435, including, for example, a tunable transmitter 420, is tuned to that appropriate color and the data packet 425 is modulated by modulator 430 into a packet signal of that appropriate color. When this colored packet signal is applied to an input port of our inventive router, it appears at a desired and specific output port of the router.

Figure 5:
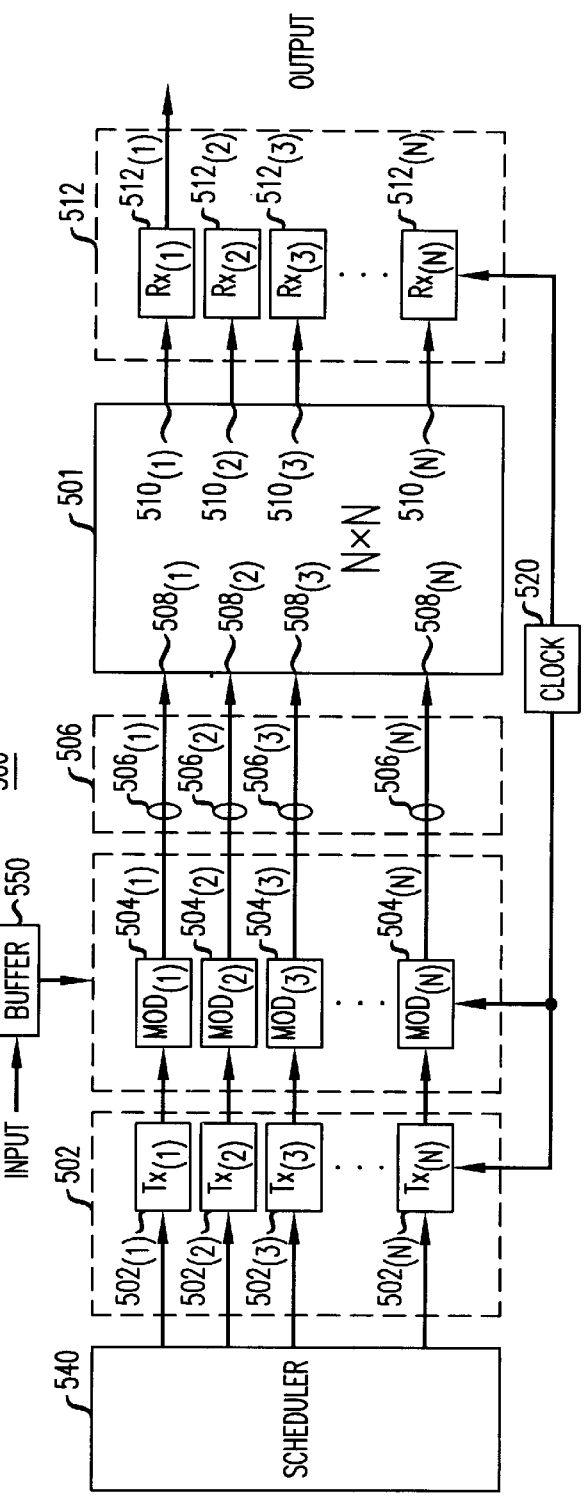

With reference now to FIG. 5, there is shown a schematic of an all optical internetwork router that includes a number of the elements previously described herein. In an elemental form, optical internetwork router 500 comprises an N×N frequency router 501 having N input ports 508(1) . . . 508(N) and N output ports 510(1) . . . 510(N); transmitter array 502 including N individual tunable transmitters 502(1) . . . 502(N); modulator array 504 including N individual modulators 504(1) . . . 504(N); receiver array 512 including N individual receivers 512(1) . . . 512(N); a common clock 520 and a scheduler 540.

As is shown in FIG. 5, individual transmitters 502(1) . . . 502(N) of the transmitter array 502 are optically connected to respective individual modulators 504(1) . . . 504(N) of the modulator array 504 which are in turn respectively coupled to individual input ports 508(1) . . . 508(N) of frequency router 501. Similarly, individual output ports 510(l) . . . 510(N) of the frequency router 501 are respectively coupled to respective individual receivers 512(1) . . . 512(N) of receiver array 512. Common clock 520 provides a common clock signal to the transmitter array 502, the modulator array 504 and the receiver array 512.

Each of the individual tunable transmitters 502(1) . . . 502(N) of the transmitter array 502 may comprise individual tunable lasers. The wavelength output by each of the individual lasers is under the control of central scheduler 540 which tunes individual lasers according to destination address of data or packets of data (not shown in FIG. 5).

In operation, individual data or data packets may be stored in buffer 550 prior to presentation to the optical internetwork router. The destination of the data or packet is determinative of the color on which it will be transmitted through the router. Accordingly, once the destination is determined and an appropriate color chosen, the appropriate laser is tuned to that appropriate color and the scheduler 540 controls its modulation by the appropriate modulator. Advantageously, the central scheduler may ensure that only one packet of data at a time is presented to the router and subsequently received by the receiver array 512. Furthermore, the modulators, tunable lasers and receivers, since they are under control of a common clock 520, allow the synchronization of data packets at the receiver array 512. Of course, the lasers and the modulators are shown as distinct elements of the drawing for clarity. Clearly the lasers may be directly modulated to produce the desired effect and those skilled in the art will recognize this fact.

Additionally, frequency routers such as that used in the present invention may exhibit optical crosstalk between neighboring frequencies. In order to minimize this undesirable attribute, polarization array 506 including an array of individual controllable polarizers 506(1) . . . 506(N) may appropriately polarize the modulated optical signals prior to being input to frequency router 501.

Various additional modifications of this invention will occur to those skilled in the art. In particular, different shapes and dimensions of the mode converters are contemplated, particularly where radiation of varying wavelengths is used. Nevertheless, all deviations from the specific teachings of this specification that basically rely upon the principles and their equivalents through which the art has been advanced are properly considered within the scope of the invention as described and claimed.

What is claimed is:

1. A routing method, comprising:
   determining a destination for a packet to be routed;
   generating a carrier signal having a frequency associated with that destination;
   modulating the carrier signal with the packet to be routed;
   polarizing the modulated carrier signal; and
   applying the polarized modulated carrier signal to a frequency routing device, wherein said frequency routing device includes:
   at least one input waveguide;
   a first free space region connected to the at least one input waveguide;
   a first plurality of output waveguides connected to the first free space region;
   an optical grating connected to the first plurality of output waveguides comprising a plurality of unequal length waveguides;
   a plurality of input waveguides connected to the optical grating;
   a second free space region connected to the plurality of input waveguides; and
   a second plurality of output waveguides connected to the second free space region, wherein the polarized modulated carrier signal is applied to the at least one input waveguide.

2. The method according to claim 1, further comprising:
   decomposing, by the frequency routing device, the modulated carrier signal into spectral components; and
   directing, at least one of the spectral components to a particular destination within the frequency routing device.

3. An optical router comprising:
   a frequency router having a plurality of input ports and a plurality of output ports;
   a plurality of transmitters including a plurality of tunable lasers respectively coupled to a plurality of modulators, said transmitters being respectively coupled to the plurality of input ports;
   a polarization controller, coupled between the plurality of transmitters and the plurality of input ports;

a plurality of receivers respectively coupled to the plurality of output ports;

a common clock providing a clock signal to the transmitters and receivers; and a scheduler coupled to the transmitter;

wherein data packets having an intended destination are modulated onto a carrier signal having a destination specific frequency and presented to an appropriate input port of the frequency routing device such that the modulated carrier signal appears at an appropriate output port of the frequency routing device.

4. The optical router according to claim 3, wherein said frequency router includes:

at least one input waveguide;

a first free space region connected to the at least one input waveguide;

a first plurality of output waveguides connected to the first free space region;

an optical grating connected to the first plurality of output waveguides comprising a plurality of unequal length waveguides;

a plurality of input waveguides connected to the optical grating;

a second free space region connected to the plurality of input waveguides; and a second plurality of output waveguides connected to the second free space region, wherein the at least one input waveguide is coupled to the plurality of input ports and the second plurality of output waveguides is coupled to the plurality of output ports.

* * * * *